Aug. 16, 1927.  1,639,351
C. E. ROBSON
PROCESS OF MAKING ROLLER BEARINGS
Filed March 11, 1924  2 Sheets-Sheet 1

INVENTOR
Clarence E. Robson
BY
Braselton, Whitcomb & Desjardins
ATTORNEYS

Aug. 16, 1927.
C. E. ROBSON
1,639,351
PROCESS OF MAKING ROLLER BEARINGS
Filed March 11, 1924   2 Sheets-Sheet 2
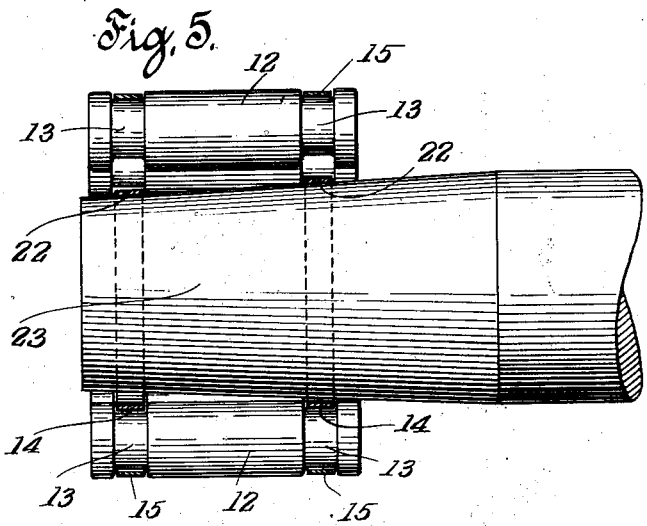
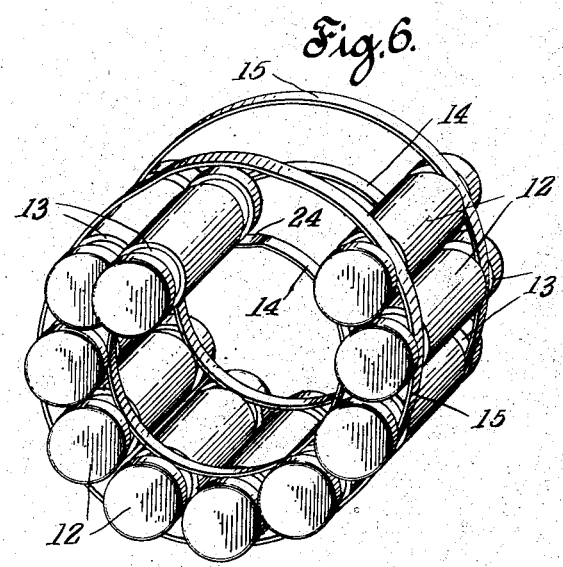
INVENTOR
Clarence E. Robson
BY
Braselton, Whitcomb & DesJardins
ATTORNEYS Patented Aug. 16, 1927.

1,639,351

UNITED STATES PATENT OFFICE.

CLARENCE E. ROBSON, OF PHILADELPHIA, PENNSYLVANIA.

PROCESS OF MAKING ROLLER BEARINGS.

Application filed March 11, 1924. Serial No. 698,366.

My invention relates to improvements in roller bearings and the process of making the same. My invention has to do more particularly with roller bearings of the type in which cylindrical rollers are employed.

The principal object of my invention is to provide an improved roller bearing which may be manufactured and assembled at a comparatively low cost and which is very efficient and satisfactory in operation.

A further object of my invention is to provide an improved cylindrical roller bearing having simple and effective means for retaining the rollers assembled with respect to each other, in a roll-set, independent of the race-ways with which they cooperate in use.

A further object of my invention is to provide a simple and effective means for maintaining the rollers of a cylindrical roller bearing in proper spaced relation to each other and to the race-ways with which they cooperate.

A further object of my invention is to provide an improved process for assembling a plurality of cylindrical rollers in a roll-set which may be quickly assembled in co-operative relation to a pair of race-ways.

A further object of my invention is to provide a cylindrical roller bearing, of the full-series type, having improved means by which the rollers may be retained in assembled relation with respect to each other, so as to form a roll-set, and to provide an improved process for assembling the rollers with relation to such retaining means.

Further objects, and objects relating to details and economies of construction and operation, will definitely appear from the detailed description to follow. In one instance, I accomplish the objects of my invention by the devices and means set forth in the following specification. My invention is clearly defined and pointed out in the appended claims. A structure constituting a preferred embodiment of my invention is illustrated in the accompanying drawing, forming a part of this specification, in which Fig. 1 is a view in elevation of a roller bearing constructed in accordance with my invention;

Fig. 5 is a vertical sectional view through a roll-set showing one means for eliminating the distortions of the inner retaining bands; and Fig. 6 is a perspective view of a roll-set showing another means for distorting the bands to permit the assembly of the rollers.

In the drawing, the same reference numerals refer to the same parts throughout the several views.

In general, my invention consists in providing, in a roller bearing comprising inner and outer races and a plurality of cylindrical rollers interposed between and rolling upon said races, each of these rollers with one or more annular grooves intermediate its ends and in retaining the rollers assembled in a roll-set by means of inner and outer retaining bands disposed in said grooves. I propose to assemble the rollers in cooperative relation with the retaining bands, to form a roll-set by distorting one or more of these bands sufficiently to permit the insertion of the rollers to proper position, and, after all the rollers have thus been assembled and the retaining bands are disposed in the grooves of the rollers, I propose to remove or eliminate the distortion of the retaining bands so that they are returned to their normal positions and function to hold the rollers assembled with reference to each other.

Figure 1:
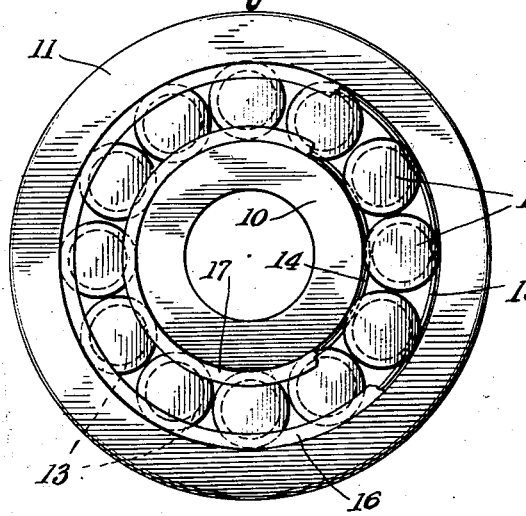
Figure 2:
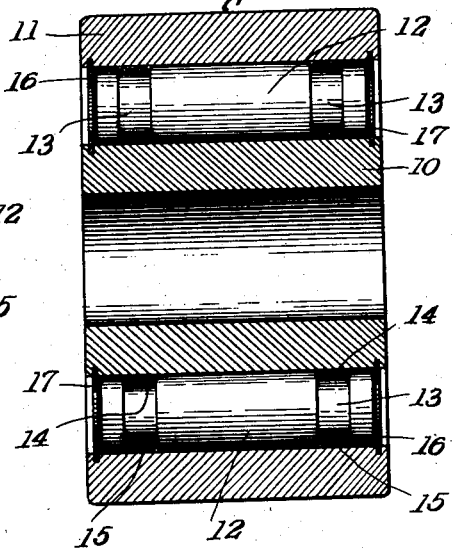
Fig. 2 is a vertical sectional view through this bearing.

Referring to the numbered parts of the drawings, in which one embodiment of my invention is illustrated, my improved roller bearing comprises an inner, cylindrical race, 10, and an outer, cylindrical race, 11. A roll-set is interposed between and coacts with these races and said roll-set comprises a plurality of cylindrical rollers 12, which coact with and roll upon the races, said rollers being maintained in assembled position with relation to each other by means of endless retaining bands. As will appear from Fig. 2, each of the cylindrical rollers, 12, is provided with a pair of annular grooves, 13, adjacent the ends of the roller. Each roll-set comprises a pair of inner retaining bands, 14, which are endless steel or metal bands interposed between the inner race and the rollers and disposed in the grooves, 13, or the respective rollers, and a pair of outer retaining bands, 15, which are endless metallic bands surrounding the rollers and also disposed in the grooves, 13. It will be observed that the depth of the grooves, 13, is such, and the diameters of the inner and outer retaining bands are such, that these retaining bands float freely between the bottoms of the grooves, 13, and the adjacent races. For instance, the inner diameter of each inner retaining band, 14, is slightly greater than the outer diameter of the inner race 10, and the outer diameter of each inner retaining band is slightly less than the outer diameter of a circle having its center on the axis of the bearing and tangent to the respective rollers at the bottoms of the grooves, 13, on the sides of the rollers nearest to the race, 10. Similarly, the diameter of the outer retaining band, 15, is slightly greater than a circle having its center on the axis of the bearing and tangent to the bottoms of the grooves of the rollers on the sides nearest the race, 11, and slightly less than the inner diameter of said race, 11. It will be observed that, by using these endless bands for retaining means, I am enabled to use a full series of rollers, as will appear from Fig. 1, thus securing a more efficient bearing and distributing the load over a greater number of rollers. The roll-set may be held in assembled position with relation to the races, 10 and 11 by means of the usual split retaining rings, 16 and 17, secured to said races adjacent the ends of the rollers.

Figure 4:
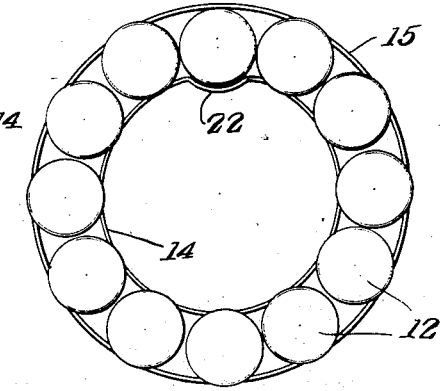
Fig. 4 is a view in elevation of a roll-set showing a plurality of rollers assembled between the inner and outer retaining bands, before the distortion in the inner bands has been eliminated.

In order to assemble the rollers with respect to the retaining bands, 14 and 15, so as to form a roll-set, I propose to distort one or more of the retaining bands, for instance, the inner retaining bands 14, from the normal shape, so as to cause the distorted portions of the retaining bands to form filling openings through which the rollers may be inserted between the retaining bands. For instance, in Fig. 4 I have shown the inner retaining bands, 14, having distorted portions, 22. The retaining bands, 14 and 15, are arranged in concentric relation to each other, and it will be observed that the distance from the mid point of the distorted portion, 22, to the retaining band, 15, is greater than the maximum diameter of the rollers, 12. Consequently, this part forms a filling opening and the rollers can be inserted endwise through this opening until the grooves, 13, are in line with the retaining bands. Thereupon, the rollers can be moved circumferentially of the bands with the bands disposed in the grooves, 13. After the last roller has been inserted through this filling opening so as to make the roll-set complete, as illustrated in Fig. 4, the distortion is removed from the retaining bands, 14, and the bands are restored to normal position. When the bands have been restored to normal position, it will be evident that the rollers are held assembled with reference to each other, independently of the races. The rollers cannot be moved endwise of the roll-set because of the bands, 14 and 15, disposed in the grooves 13. Consequently, I have produced a roll-set which may be handled as a unit without danger of the rollers becoming displaced.

Figure 3:
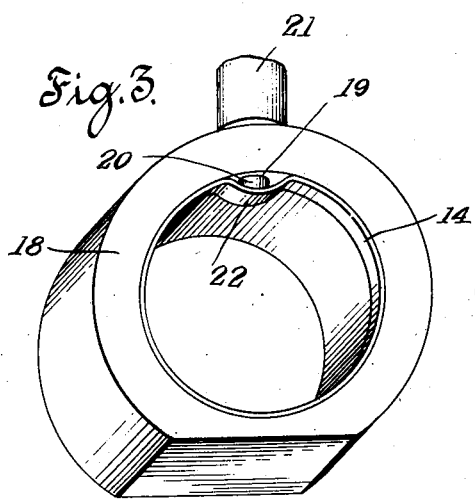
Fig. 3 is a perspective view illustrating one means by which one of the retaining bands may be distorted as a step in assembling the rollers and retaining bands to form a roll-set.

In Fig. 3, I have shown a convenient means for distorting the retaining bands, 14, as a step preliminary to the assembling of the rollers. This comprises a form, 18, having a seat designed to support one of the retaining bands, 14, and provided with a radial opening, 19, through which the shank, 20, of a distorting tool, 21, extends. It will be observed that the ring, 14, may be mounted in this form, 18, and, when the shank, 20, of the tool, 21, is driven through the radial opening, 19, the ring 14 will be bent inwardly at a point adjacent the opening, 19, thus forming the distortion, 22, at this point.

In Fig. 6, I have shown another method of distorting the rings to permit the assembly of the rollers. According to this method, the bands, 14 and 15 are first placed slightly eccentric to each other, thus giving a larger space between the bands on one side, through which space the rollers may be passed endwise until the grooves 13 of the rollers are in line with the retaining bands. As the rollers are thus inserted, and the roll-set is gradually filled, the retaining bands, 14, will be gradually brought into concentricity with each other. In order to insert the last two or three rollers, the ends of such rollers are inserted like wedges between the retaining bands, 14 and 15, and force is applied to such rollers to distort the bands sufficiently to form a filling opening through which the remaining rollers may be inserted. After these rollers have been inserted and are in proper position, the distortion thus produced is removed by any suitable means so as to restore the retaining bands to their normal circular form.

In Fig. 5, I have shown a convenient means for removing the distortion of the inner retaining bands and restoring them to normal shape. To accomplish this, I propose to provide a mandrel having a tapered nose, 23, which is inserted axially of the roll-set so that the tapered nose engages the distortions, 22, of the retaining bands, 14, and, as force is applied to move the mandrel axially of the roll-set, this tapered nose acts with a wedge action to restore the distortions to normal position. A similar means may be provided for restoring the outer bands to normal position, in case they have been distorted in connection with the assembling process.

I have shown the roll-set assembled by forming distortions in the inner retaining bands to permit of the insertion of the rollers, but my invention is not to be restricted to the distortion of the inner bands as it will be obvious, to one skilled in the art, that the same result might be accomplished by suitably distorting the outer retaining bands and then restoring such bands to their normal circular position after the rollers have been assembled. I am not to be restricted to the means specifically shown herein for distorting the retaining bands, or for removing such distortions and restoring the bands to their normal circular shape.

I have provided a roller bearing which is very simple, consists of very few parts and can be manufactured and assembled very quickly and cheaply. It will be observed that the retaining bands, 14 and 15, are exceedingly simple and require little metal in their manufacture, and, furthermore, these bands do not have a binding effect upon the rollers and, therefore, are not likely to generate internal heat and friction in use. The process of assembling these rollers to form a roll-set is comparatively simple and one which can be performed by unskilled labor at very little cost. Consequently, I have provided a cylindrical roller bearing which may be manufactured very economically and which is, nevertheless, very efficient and satisfactory in operation.

Although, in the accompanying drawings, I have shown the inner and outer race-ways 10 and 11, my invention is not to be restricted to the use of such race-ways. In some cases a roll-set embodying my invention may be mounted directly on a shaft with the rollers cooperating with the shaft and with an internal bearing seat, without the use of the separate race-ways. I consider, in such cases, the shaft and bearing seat to constitute inner and outer races with which the rollers cooperate, and to be within the spirit of my invention.

I am aware that the particular embodiment of my invention, which has been described herein, may be varied considerably without departing from the spirit of my invention and, therefore, I claim my invention broadly as indicated by the appended claims.

Having thus described my invention, what I claim as new and useful and desire to secure by Letters Patent is:

1. The process of assembling a roll-set for a roller bearing, comprising the forming of inner and outer circular retaining bands, the distortion of one of said bands from its normal circular form, inserting rollers having annular grooves to receive said bands between said bands, and then restoring said distorted band to its normal circular form.

2. The process of assembling a roll-set for a roller bearing, including inner and outer retaining bands which are circular and a plurality of rollers provided with annular grooves in which said bands are normally positioned, comprising distorting one of said bands from its normal circular shape, arranging said bands in substantially concentric relation, inserting the rollers by an endwise movement between said bands, adjacent the zone of distortion, until said grooves are in line with the bands, and then submitting said band to pressure to restore it to circular shape and remove the distortion.

3. The process of assembling a roll-set for a roller bearing, which roll-set includes a pair of inner circular retaining bands, a pair of outer circular retaining bands and a plurality of rollers each of which has a pair of annular grooves in which said retaining bands are normally positioned, comprising the preliminary distortion of the inner retaining bands from normal circular shape, positioning the inner and outer retaining bands in concentric relation, the endwise insertion of the grooved rollers between said inner and outer bands adjacent the zone of distortion, and then acting upon said inner retaining bands to remove the distortion and restore them to normal circular shape.

4. The process of assembling a roll-set for a roller bearing which roll-set includes inner and outer endless circular retaining bands and grooved rollers cooperating therewith, comprising the distortion of one of said bands to provide a filling opening, the insertion of one or more of said rollers between the bands through said filling opening, and the restoring of said bands to normal circular shape.

In testimony whereof, I affix my signature.

CLARENCE E. ROBSON.